United States Patent Office 3,257,395
Patented June 21, 1966

3,257,395
THIADIAZINE DIOXIDES
Rudolf G. Griot, Florham Park, N.J., assignor to
Sandoz, Inc., Hanover, N.J.
No Drawing. Filed June 11, 1964, Ser. No. 374,259
24 Claims. (Cl. 260—243)

This invention is directed to 1,2,4-benzothiadiazine derivatives and to intermediates in the preparation thereof. The benzothiadiazine compounds possess CNS (central nervous system) activity and can be used accordingly. Said compounds are those of the formula

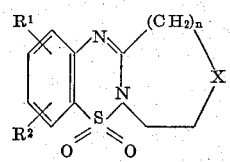
(I)

wherein each of $R^1$ and $R^2$ is, independently, either a hydrogen atom
   (—H); lower alkyl, e.g. methyl, ethyl, propyl, isopropyl
   and butyl; or a halogen atom, e.g. chlorine (—Cl),
   bromine (—Br), fluorine (—F) and iodine (—I);
$n$ is one of the integers 1 and 2;
X is —CH$_2$— for one class of compounds;
   is —S— for a second class of compounds;
   is —O— for a third class of compounds; and
   is

for a fourth class of compounds; and
R is either a hydrogen atom (—H) or lower alkyl, e.g.
   methyl, ethyl, propyl, isopropyl and butyl.

The corresponding intermediates are compounds of the formula

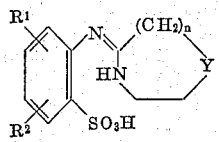
(II)

wherein each of $R^1$, $R^2$ and $n$ has its above-ascribed meaning, and
Y is either methylene (—CH$_2$—), sulfur (—S—), oxygen
   (—O—) or >N-carbobenzoxy (=N—Cbz).

Throughout this disclosure R, $R^1$, $R^2$, Y and $n$ are defined as noted above unless otherwise indicated. $R^1$ and $R^2$ are bonded to any two of the available positions in the benzene nucleus of Formula I.

Intermediates (II) are prepared according to reaction scheme (A)

(A)
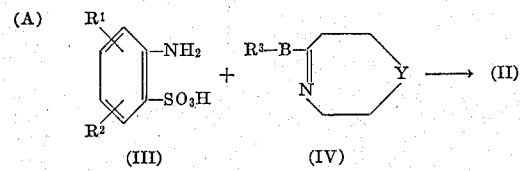

wherein $R^3$ is either methyl or ethyl, and
B is either oxygen (—O—) or sulfur (—S—);

and the final products (I) are prepared according to reaction schemes (B), (C) and (D)

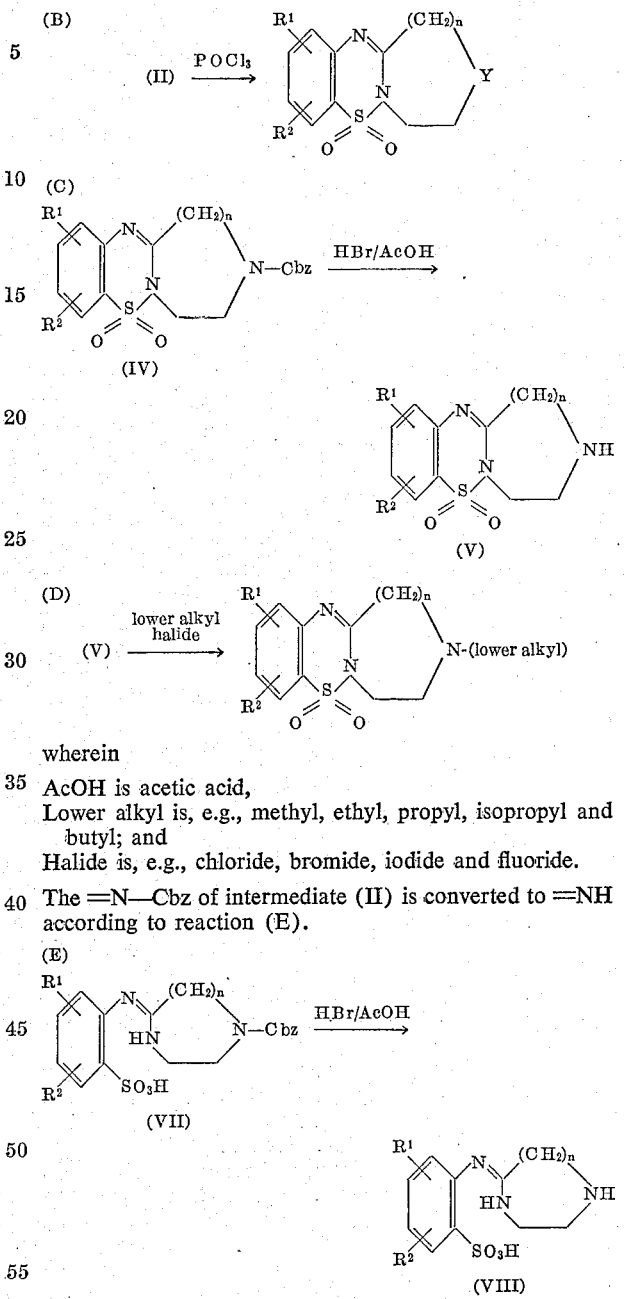

wherein

AcOH is acetic acid,
Lower alkyl is, e.g., methyl, ethyl, propyl, isopropyl and butyl; and
Halide is, e.g., chloride, bromide, iodide and fluoride.

The =N—Cbz of intermediate (II) is converted to =NH according to reaction (E).

(E)
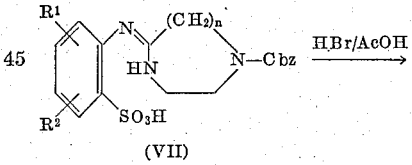

(VIII)

The final products (I) of this invention are useful as sedatives, mild tranquilizers and anticonvulsants. They are administered either orally or parenterally in daily doses of from 150 milligrams to 225 milligrams. These compounds are weak analgesics and mild CNS depressants.

The following examples illustrate the invention, the parts and percentages being by weight unless otherwise stated, and the relationship of parts by weight to parts by volume being the same as that of the kilogram to the liter. All temperatures are in degrees centigrade.

*Example 1.—5-chloro-4-methyl-2-(perhydro-azepin-2-imino)-benzenesulfonic acid*

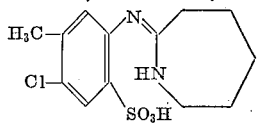

Add 2.2 parts of O-methylcaprolactim in 20 parts by volume of absolute methanol dropwise (over a period of 30 minutes at room temperature, i.e. 20°) to 2.23 parts of 2-amino-5-chloro-4-methylbenzenesulfonic acid. Maintain the resultant at room temperature over night (17 to 19 hours). The title compound precipitates.

Filter the precipitate and recrystallize same from isopropanol to obtain 1.10 parts of title compound, melting point (M.P.) in excess of 350°.

The O-methylcaprolactim is replaced with an equivalent of either caprolactim ethyl ether, methylthiocaprolactim or ethylthiocaprolatcim with the same results, i.e. the product obtained is the same. When the O-methylcaprolactim is replaced by the ethyl ether of (a) 1-oxa-4-aza-azepin-5-one, (b) 1-thia-4-aza-azepin-5-one, (c) 3-ketomorpholine, (d) 3-ketothiomorpholine, (e) 1-carbobenzoxy-3-ketopiperazine or (f) 1-carbobenzoxy-1,4-diazepin-5-one, the precipitate obtained is the corresponding intermediate (II). The later is also true when said O-methylcaprolactim is replaced by either. the methylthioether or the ethylthioether of any of (a) to (f).

When the 2-amino-5-chloro-4-methylbenzenesulfonic acid is replaced by an equivalent of any 2-amino benzenesulfonic acid (III), e.g. 2-aminobenzenesulfonic acid, 2-amino-4-bromobenzenesulfonic acid, 2-amino-5-isopropyl-4-fluorobenzenesulfonic acid, 2-amino - 4-chloro-5-iodobenzenesulfonic acid, 2-amino-4,5-dibromobenzenesulfonic acid and 2-amino-5-fluorobenzenesulfonic acid, the corresponding intermediate (II) is precipitated. Each compound (III) is reacted with each compound (IV) according to the process of this example to obtain the corresponding intermediate (II).

*Example 2.—3-chloro-2methyl-5,7,8,9,10,11-hexahydroazepino[1,2-b]benzo[1,2,4]thiadiazine-5,5-dioxide*

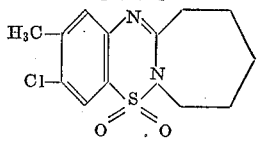

Add 20 parts by volume of phosphorus oxychloride (POCl₃) and a catalytic amount (about 2 drops per gram of intermediate) of dimethylformamide to 1 part of the title compound of Example 1 (intermediate). Heat the obtained mixture for 5 minutes on a steam bath, whereupon it becomes homogenous.

Evaporate excess POCl₃ in vacuo from the resultant. Neutralize the residue with 50 percent (aq) potassium carbonate ($K_2CO_3$) solution. Extract the thus-neutralized material with chloroform, and evaporate the solvent from the chloroform extract. Recrystallize the residue from methanol/isopropanol to obtain 0.50 part of pure title compound, M.P. 114° to 116.5°.

In the same manner each compound (II), e.g. those indicated supra as preparable according to the procedure of Example 1, is employed to produce the corresponding compound (I).

*Example 3.—5-chloro-4methyl-2-(piperazin-2-imino) benzenesulfonic acid*

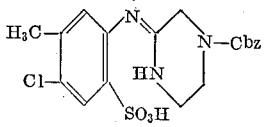

To 50 parts by volume of absolute methanol add 4.215 parts (0.0189 mole) of 2-amino-5-chloro-4-methylsulfonic acid and 10.0 parts (0.0378 mole) of the ethyl ether of 4-carbobenzoyl-2-ketopiperazine. Stir the resultant at room temperature for twelve hours. The title compound precipitates.

Filter the precipitate and recrystallize same from methanol/isopropanol. There are thus obtained 2.2 parts of the title compound, M.P. 259.0° to 260.5° (decomp.).

When the ethyl ether of 4-carbobenzoyl-2-ketopiperazine is replaced by the ethyl ether of 3-ketomorpholine, the ethyl ether of 3-ketothiomorpholine or the ethyl ether of 1-carbobenzoxy-1,4-diazepin-5-one, the precipitate obtained is the corresponding intermediate (II).

*Example 4.—2-carbobenzoxy-8-chloro-9-methyl-piperazino[1,2-]-[1,2,4]benzothiadiazine-6,6-dioxide*

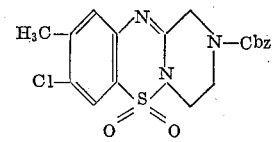

Add 20 parts by volume of phosphorus oxychloride (POCl₃) and a catalytic amount (one drop per each five parts by volume of POCl₃) of dimethylformamide to 1.2 parts (0.00224 mole) of the title compound (intermediate) of Example 3. Heat the obtained mixture for 10 minutes on a steam bath, whereupon it becomes homogeneous.

Evaporate excess POCl₃ in vacuo from the resultant. Neutralize the residue with 50 percent (aq) potassium carbonate ($K_2CO_3$) solution. Extract the thus-neutralized material with chloroform, and evaporate the solvent from the chloroform extract. Recrystallize the residue from methanol/isopropanol to obtain 0.3 part of the title compound, M.P. 277.5° to 278.0° (decomp.).

*Example 5.—8-chloro-9-methyl-piperazino [1,2-b]-[1,2,4]benzothiadiazine-6,6-dioxide*

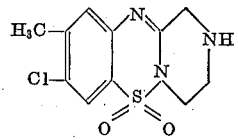

Suspend 1.5 parts of the title compound of Example 4 in 20 parts by volume of 4 N (normal) hydrogen bromide in acetic acid. Maintain the resulting product at room temperature for 4 hours. Add 200 parts by volume of dry diethyl ether to the obtained product to precipitate the hydrogen bromide of the instant title compound. Collect the precipitate on a sintered glass filter.

Dissolve said precipitate in 5 parts by volume of water. Add to the resultant solution an excess of potassium carbonate. The free base of the title compound is thus obtained. Extract same with chloroform and dry over solid potassium carbonate. Evaporate the solvent, and crystallize the free base, M.P. 164° with decomposition, from ethanol.

*Example 6.—1-methyl-8-chloro-9-methyl-piperazino [1,2-b]-[1,2,4]benzothiadiazine-6,6-dioxide*

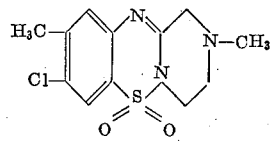

To 250 parts of the title compound of Example 5 in 10 parts by volume of methanol, add dropwise 135 parts of dimethyl sulfate in 5 parts by volume of methanol. Maintain the reaction temperature between 25° and 30° for one hour. Thereafter evaporate the resulting mixture to dryness. Dissolve the residue in water (made alkaline with potassium carbonate solution. Extract the resultant product with chloroform. Submit the chloroform extract to column chromatography. Crystallize the thus-purified product after recrystallization from cyclohexane.

It is thought that the invention and its advantages will be understood from the foregoing description. It is apparent that various changes may be made in the processes, the intermediates and the final products without departing from the spirit and/or scope of the invention or sacrificing its material advantages, the processes, intermediates and final products hereinbefore described being merely illustrative embodiments.

What is claimed is:

1. A compound of the formula

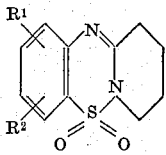

wherein each of $R^1$ and $R^2$ is, independently, a member selected from the group consisting of a hydrogen atom, lower alkyl, and a halogen atom.

2. The compound of the formula

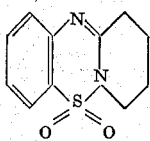

3. A compound of the formula

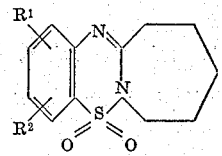

wherein each of $R^1$ and $R^2$ is, independently, a member selected from the group consisting of a hydrogen atom, lower alkyl, and a halogen atom.

4. 3-chloro-2-methyl-5,7,8,9,10,11 - hexahydroazepino-[1,2-b]benzo[1,2,4]thiadiazine-5,5-dioxide.

5. A compound of the formula

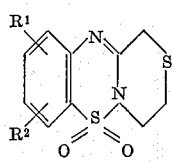

wherein each of $R^1$ ad $R^2$ is, independently, a member selected from the group consisting of a hydrogen atom, lower alkyl, and a halogen atom.

6. The compound of the formula

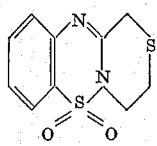

7. A compound of the formula

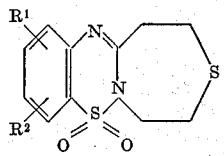

wherein each of $R^1$ and $R^2$ is, independently, a member selected from the group consisting of a hydrogen atom, lower alkyl, and a halogen atom.

8. The compound of the formula

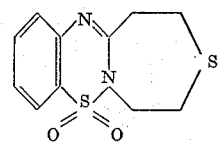

9. A compound of the formula

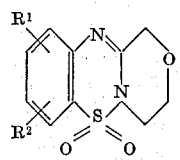

wherein each of $R^1$ and $R^2$ is, independently, a member selected from the group consisting of a hydrogen atom, lower alkyl, and a halogen atom.

10. The compound of the formula

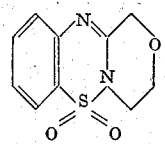

11. A compound of the formula

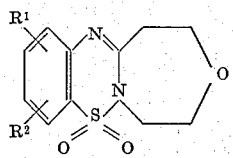

wherein each of $R^1$ and $R^2$ is, independently, a member selected from the group consisting of a hydrogen atom, lower alkyl, and a halogen atom.

12. The compound of the formula

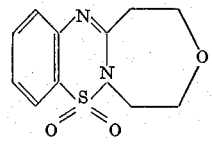

13. A compound of the formula

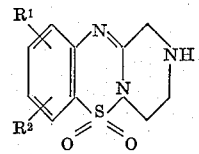

wherein each of $R^1$ and $R^2$ is, independently, a member selected from the group consisting of a hydrogen atom, lower alkyl, and a halogen atom.

14. 8-chloro-9 - methyl-piperazino[1,2-b]-[1,2,4]benzothiadiazine-6,6-dioxide.

15. 2 - carbobenzoxy-8-chloro-9 - methyl-piperazino-[1,2-b]-[1,2,4]benzothiadiazine-6,6-dioxide.

16. A compound of the formula

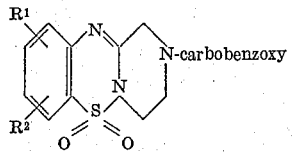

wherein each of $R^1$ and $R^2$ is, independently, a member selected from the group consisting of a hydrogen atom, lower alkyl, and a halogen atom.

17. A compound of the formula

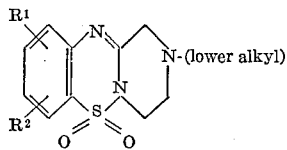

wherein each of $R^1$ and $R^2$ is independently, a member selected from the group consisting of a hydrogen atom, lower alkyl, and a halogen atom.

18. 2 - methyl-8-chloro-9 - methyl-piperazino[1,2-b]-[1,2,4]benzothiadiazine-6,6-dioxide.

19. A compound of the formula

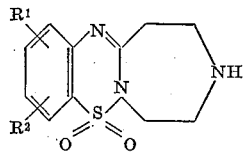

wherein each of $R^1$ and $R^2$ is, independently, a member selected from the group consisting of a hydrogen atom, lower alkyl, and a halogen atom.

20. The compound of the formula

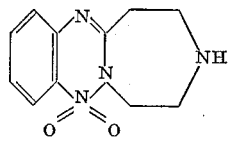

21. A compound of the formula

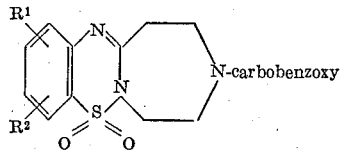

wherein each of $R^1$ and $R^2$ is, independently, a member selected from the group consisting of a hydrogen atom, lower alkyl, and a halogen atom.

22. The compound of the formula

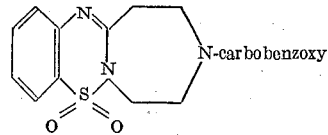

23. A compound of the formula

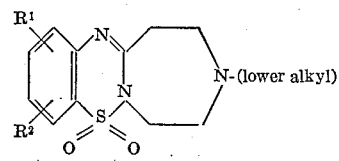

wherein each of $R^1$ and $R^2$ is, independently, a member selected from the group consisting of a hydrogen atom, lower alkyl, and a halogen atom.

24. The compound of the formula

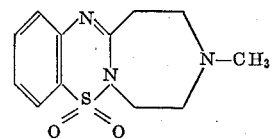

No references cited.

NICHOLAS S. RIZZO, *Primary Examiner.*